(12) United States Patent
Chin et al.

(10) Patent No.: US 9,094,883 B2
(45) Date of Patent: Jul. 28, 2015

(54) METHOD AND APPARATUSES FOR RETURNING THE TRANSMISSION OF THE UPLINK TO A SOURCE CELL DURING A BATON HANDOVER

(75) Inventors: Tom Chin, San Diego, CA (US);
Guangming Shi, San Diego, CA (US);
Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 13/379,621

(22) PCT Filed: Mar. 31, 2010

(86) PCT No.: PCT/US2010/029519
§ 371 (c)(1),
(2), (4) Date: Dec. 20, 2011

(87) PCT Pub. No.: WO2011/037649
PCT Pub. Date: Mar. 31, 2011

(65) Prior Publication Data
US 2012/0172043 A1 Jul. 5, 2012

Related U.S. Application Data

(60) Provisional application No. 61/244,784, filed on Sep. 22, 2009.

(51) Int. Cl.
*H04W 36/00* (2009.01)
*H04W 36/08* (2009.01)
(Continued)

(52) U.S. Cl.
CPC .......... *H04W 36/08* (2013.01); *H04W 36/0055* (2013.01); *H04W 24/10* (2013.01);
(Continued)

(58) Field of Classification Search
CPC ..... H04W 36/30; H04W 36/18; H04W 24/10; H04W 36/08; H04W 72/082; H04W 48/20; H04W 72/02; H04W 36/0055; H04W 92/20; H04W 28/26; H04W 36/0072; H04W 36/36; H04W 36/38
USPC .......... 455/436–444, 450, 451, 525; 370/332, 370/280, 465, 328–331
See application file for complete search history.

(56) References Cited

U.S. PATENT DOCUMENTS

| 6,885,866 B1 | 4/2005 | Wikstedt et al. |
| 6,993,341 B2 * | 1/2006 | Hunzinger ..................... 455/450 |

(Continued)

FOREIGN PATENT DOCUMENTS

| CN | 1665342 A | 9/2005 |
| CN | 1678115 A | 10/2005 |

(Continued)

OTHER PUBLICATIONS

Taiwan Search Report—TW099110793—TIPO—Sep. 5, 2013.
(Continued)

*Primary Examiner* — Olumide T Ajibade Akonai
(74) *Attorney, Agent, or Firm* — Kristine U. Ekwueme

(57) ABSTRACT

An apparatus and method enable mobile user equipment to return to a first cell after attempting a baton handover to a second cell. In one aspect of the disclosure, a method of wireless communication in a cellular network including a source cell and a target cell is disclosed. Here, the method includes switching transmission of an uplink from the source cell to the target cell while maintaining a downlink with the source cell, determining to return the transmission of the uplink to the source cell, and returning the transmission of the uplink from the target cell to the source cell. In some aspects, the method may further include switching reception of a downlink from the source cell to the target cell, determining to return the reception of the downlink to the source cell, and returning the reception of the downlink from the target cell to the source cell.

56 Claims, 9 Drawing Sheets

(51) Int. Cl.
   *H04W 72/08*   (2009.01)
   *H04W 92/20*   (2009.01)
   *H04W 24/10*   (2009.01)
   *H04W 48/20*   (2009.01)
   *H04W 36/28*   (2009.01)

(52) U.S. Cl.
   CPC .......... *H04W36/0072* (2013.01); *H04W 36/28* (2013.01); *H04W 48/20* (2013.01); *H04W 72/082* (2013.01); *H04W 92/20* (2013.01)

(56) References Cited

U.S. PATENT DOCUMENTS

| | | | |
|---|---|---|---|
| 8,054,806 B2* | 11/2011 | Aydin et al. | 370/331 |
| 8,060,098 B2* | 11/2011 | Yang et al. | 455/439 |
| 2003/0117980 A1* | 6/2003 | Kim et al. | 370/332 |
| 2005/0272426 A1* | 12/2005 | Yang et al. | 455/436 |
| 2006/0022909 A1 | 2/2006 | Kwak et al. | |
| 2007/0161389 A1* | 7/2007 | Khandekar | 455/517 |
| 2007/0195688 A1 | 8/2007 | Bhushan et al. | |
| 2007/0206698 A1 | 9/2007 | Yu et al. | |
| 2007/0293224 A1* | 12/2007 | Wang et al. | 455/436 |
| 2008/0198800 A1* | 8/2008 | Zhang et al. | 370/329 |
| 2009/0131058 A1* | 5/2009 | Dupuy et al. | 455/439 |
| 2010/0080181 A1* | 4/2010 | Yamada et al. | 370/329 |
| 2010/0234027 A1* | 9/2010 | Han et al. | 455/436 |
| 2011/0105121 A1* | 5/2011 | Kazmi et al. | 455/436 |

FOREIGN PATENT DOCUMENTS

| | | |
|---|---|---|
| CN | 1933652 A | 3/2007 |
| WO | WO2005096641 | 10/2005 |
| WO | WO2007114966 | 10/2007 |
| WO | WO2009084998 A1 | 7/2009 |

OTHER PUBLICATIONS

Bo Li et al., "Recent advances on TD-SCDMA in China," IEEE Communications Magazine, IEEE Service Center, 2005, vol. 43, 30-37.

International Search Report and Written Opinion—PCT/US2010/029519, International Search Authority—European Patent Office—Sep. 16, 2010.

* cited by examiner

METHOD AND APPARATUSES FOR RETURNING THE TRANSMISSION OF THE UPLINK TO A SOURCE CELL DURING A BATON HANDOVER

CROSS-REFERENCE TO RELATED APPLICATIONS

This application claims the benefit of U.S. Provisional Patent Application No. 61/244,784, entitled "APPARATUS AND METHOD FOR RETURNING DURING BATON HANDOFF," filed on Sep. 22, 2009, which is expressly incorporated by reference herein in its entirety.

BACKGROUND

1. Field

Aspects of the present disclosure relate generally to wireless communication systems, and more particularly, to the management of a handover between a source cell and a target cell in a cellular communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

According to various aspects of the instant disclosure, an apparatus and method enable user equipment to return to a source cell after attempting a baton handover to a target cell. Aspects of the disclosure may provide robust procedures in baton handover to reduce or avoid call drop.

In an aspect of the disclosure, a method of wireless communication in a cellular network including a source cell and a target cell is disclosed. Here, the method includes switching transmission of an uplink from the source cell to the target cell while maintaining a downlink with the source cell, determining to return the transmission of the uplink to the source cell, and returning the transmission of the uplink from the target cell to the source cell. In some aspects, the method may further include switching reception of a downlink from the source cell to the target cell, determining to return the reception of the downlink to the source cell, and returning the reception of the downlink from the target cell to the source cell.

In an aspect of the disclosure, an apparatus for wireless communication in a cellular network including a source cell and a target cell is disclosed. Here, the apparatus includes means for switching transmission of an uplink from the source cell to the target cell while maintaining a downlink with the source cell, means for determining to return the transmission of the uplink to the source cell, and means for switching the transmission of the uplink from the target cell to the source cell. In some aspects, the apparatus may further include means for switching reception of a downlink from the source cell to the target cell, means for determining to return the reception of the downlink to the source cell, and means for returning the reception of the downlink from the target cell to the source cell.

In an aspect of the disclosure, a computer program product including a computer-readable medium is disclosed. Here, the computer readable medium includes code for switching transmission of an uplink from the source cell to the target cell while maintaining a downlink with the source cell, code for determining to return the transmission of the uplink to the source cell, and code for switching the transmission of the uplink from the target cell to the source cell. In some aspects, the computer-readable medium further includes code for switching reception of a downlink from the source cell to the target cell, code for determining to return the reception of the downlink to the source cell, and code for returning the reception of the downlink from the target cell to the source cell.

In an aspect of the disclosure, an apparatus for wireless communication in a cellular network comprising a source cell and a target cell is disclosed. Here, the apparatus includes at least one processor and a memory coupled to the at least one processor. The at least one processor is configured to switch transmission of an uplink from the source cell to the target cell while maintaining a downlink with the source cell, determine to return the transmission of the uplink to the source cell, and return the transmission of the uplink from the target cell to the source cell. In some aspects, the at least one processor is further configured to switch reception of a downlink from the source cell to the target cell, determine to return the reception of the downlink to the source cell, and return the reception of the downlink from the target cell to the source cell.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
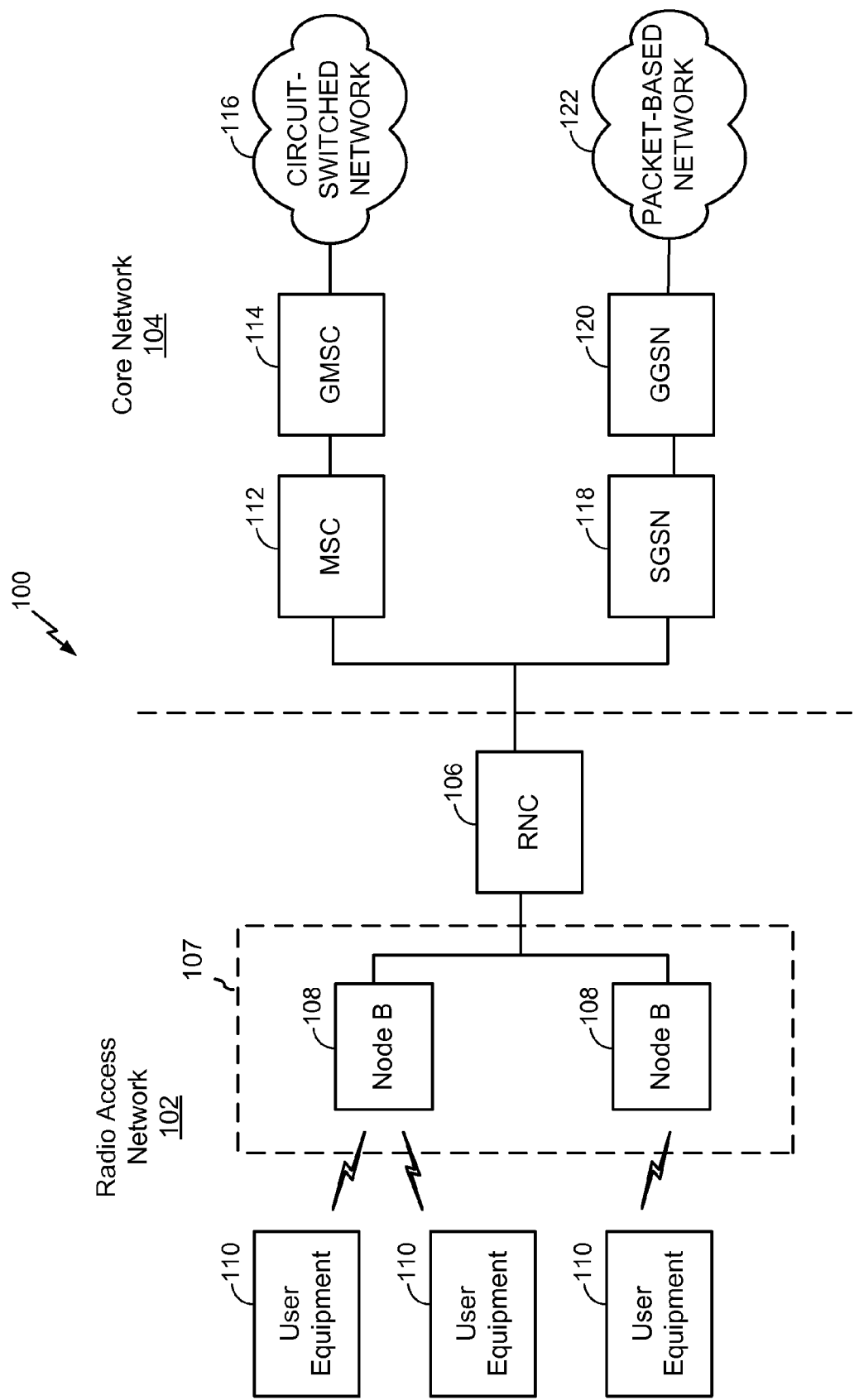
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the UL and DL between a Node B 108 and a UE 110, but divides uplink and downlink transmissions into different time slots in the carrier.

Figure 2:
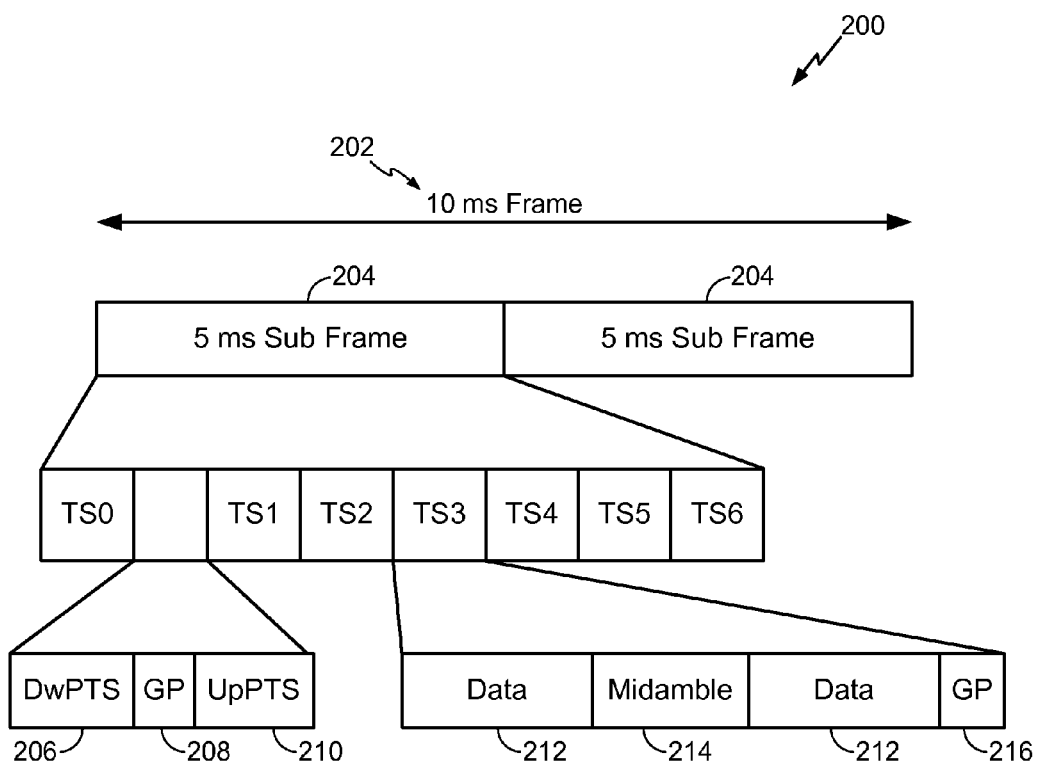
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a GP 216. The midamble 214 may be used for features, such as channel estimation, while the GP 216 may be used to avoid inter-burst interference.

Figure 3:
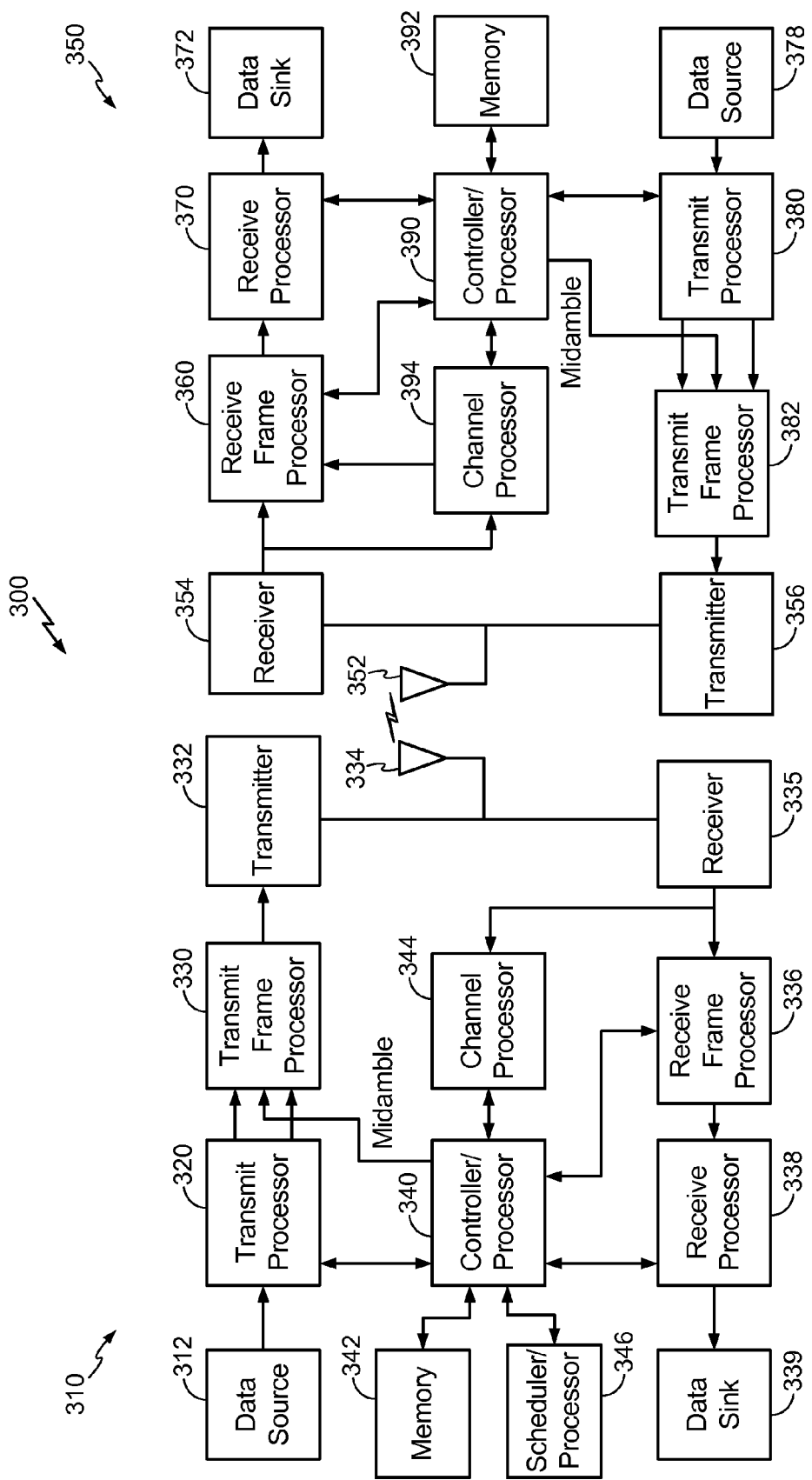
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

A handover (or handoff) is generally a process of transferring an ongoing call or data session from one channel connected to a network, to another channel connected to the network. Frequently, cellular communication systems perform a handover from one cell to another, for example, when a UE moves away from an area covered by one cell (e.g., a source cell) and into an area covered by a second cell (e.g., a target cell), or for a perceived improvement in signal quality, or other reasons. TD-SCDMA systems frequently support two types of handover: hard handover and baton handover. In the hard handover, the UE generally changes both DL and UL channels from the source cell to the target cell at substantially the same time. Before the UE can establish the DPCH (Dedicated Physical Channel) on the DL, the UE generally performs UL synchronization procedures on the UpPCH (Uplink Pilot Channel) by sending a SYNC UL code, and receives timing correction information on the FPACH (Fast Physical Access Channel).

In baton handover, on the other hand, the UE first switches the UL to the target cell, and then switches the DL to the target cell after the UL is suitably established with the target cell. The two steps in baton handover enable the target cell to acquire the UL, measure timing and power, and configure beam forming before the DL is switched to the target cell. In general, the baton handover procedure may be less disruptive than hard handover.

In one configuration, the UE 350 for wireless communication includes means for performing a handover, including determining to initiate, terminate, or reverse the handover procedure. Referring again to FIG. 3, in one aspect, the aforementioned means may include the processor(s) 394 and/or 390 configured to perform the functions recited by the aforementioned means. In another aspect, the aforementioned means may be a module or any apparatus configured to perform the functions recited by the aforementioned means. In a further configuration, the UE 350 includes means for characterizing the UL and/or DL channels, including determining a metric of quality of the UL and/or DL channels. Here, the aforementioned means may include the processor(s) 370, 380, and/or 394 configured to perform the functions recited by the aforementioned means.

Figure 4:
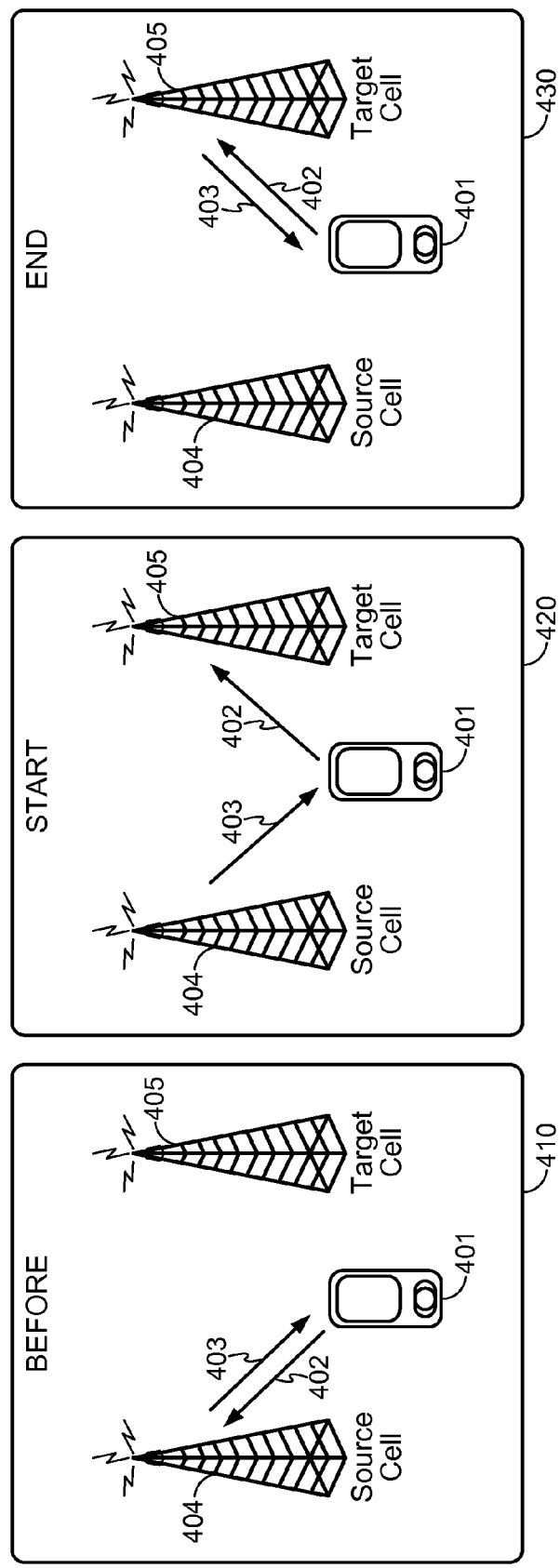
FIG. 4 is a conceptual diagram illustrating a baton handover procedure.

FIG. 4 is a simplified illustration showing a baton handover, with three illustrations in time sequence from left to right. In block 410, UE 401 has an established UL 402 and DL 403 with source cell 404. In block 420, UE 401 has switched its UL 402 to target cell 405, and the DL 403 is maintained with the source cell 404. That is, transmission of the UL 402 has switched from source cell 404 to target cell 405. In block 430, UE 401 has switched its UL 402 and its DL 403 to target cell 405. That is, transmission of the UL 402 has switched from source cell 404 to target cell 405, and transmission of the DL 403 has ceased from source cell 404 and has been replaced by transmission of the DL from target cell 405.

Figure 5:
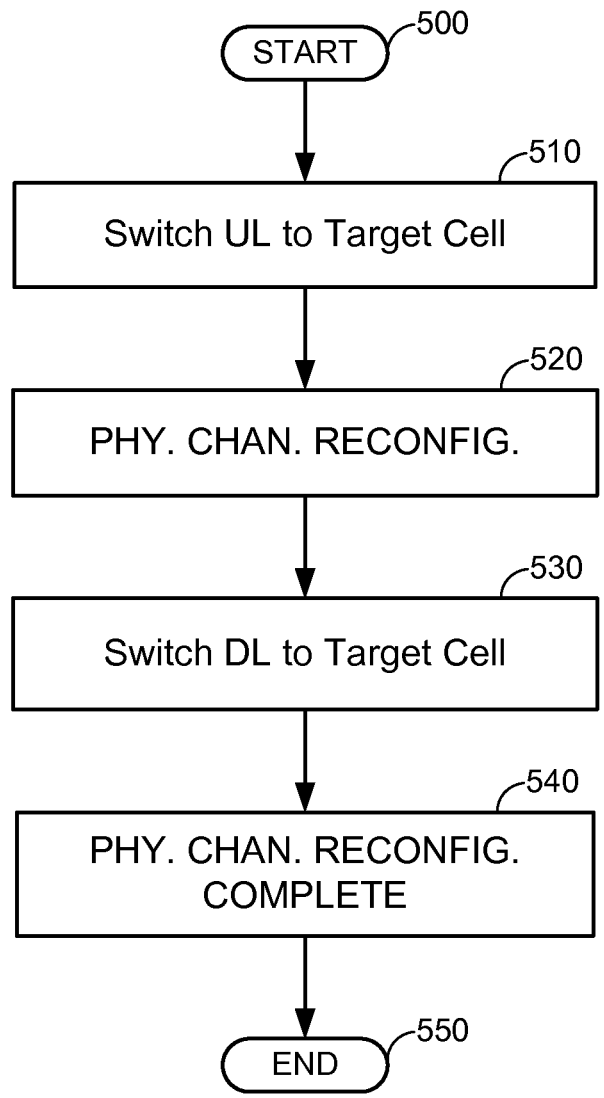
FIG. 5 a flow chart illustrating a prior art baton handover procedure.

FIG. 5 is a flow chart illustrating a conventional baton handover procedure. The procedure begins at block 500, generally after the network, the UE, or both determine that a handover from a source cell to a target cell should occur for one or more of a variety of reasons, as discussed above. In block 510, the UE switches the UL from the source cell to the target cell. In block 520, a PHYSICAL CHANNEL RECONFIGURATION message is sent from the network to the UE. This message is generally sent through the DL from the source cell, after the network has determined that the UL is suitably established with the target cell. In block 530, the DL is switched from the source cell to the target cell. In block 540, a PHYSICAL CHANNEL RECONFIGURATION COMPLETE message is sent from the UE to the network by utilizing the UL to the target cell. With this signal received, the baton handover is complete, and the process ends at block 550.

An issue with a conventional baton handover scheme is that under certain circumstances the UE may not successfully complete the switching of the UL to the target cell. Thus, according to various aspects of this disclosure, based on a number of metrics or factors discussed below, the UE may return the UL to the source cell.

According to an aspect of the disclosure, during a baton handover, there are two possibilities under which a handover may return to the source cell. First, at a "start stage," that is, after the UE has switched the UL to the target cell but still maintains the DL with the source cell, the UL may return to the source cell. Second, at an "end stage," that is, after the UE has switched both the UL and the DL to the target cell, but has not yet confirmed with the PHYSICAL CHANNEL RECONFIGURATION COMPLETE message, both the UL and DL may return to the source cell.

Figure 6:
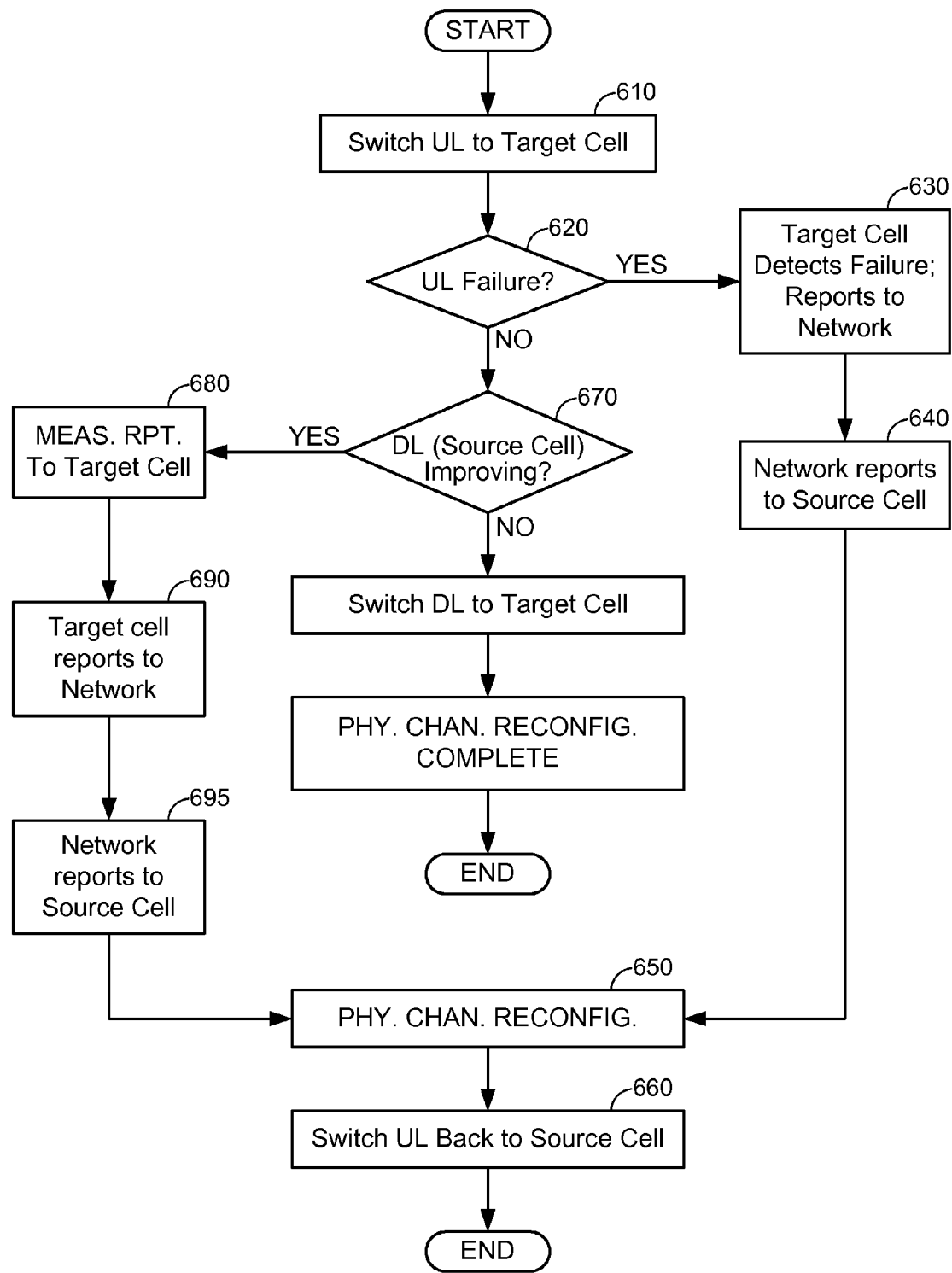
FIG. 6 is a flow chart conceptually illustrating a baton handover procedure according to an aspect of the instant disclosure.
Figure 7:
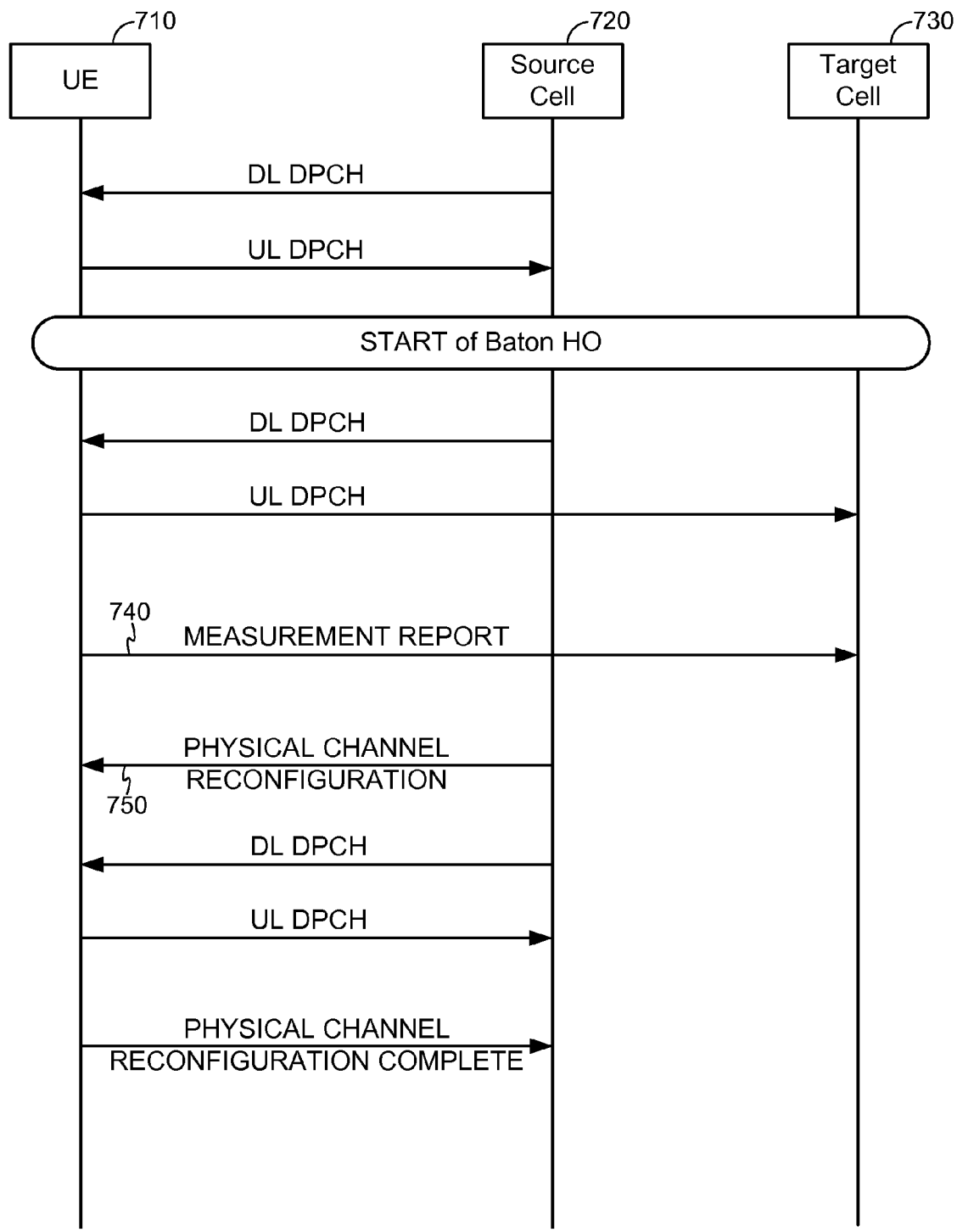
FIG. 7 is a call flow diagram conceptually illustrating the handover process illustrated in FIG. 6.

FIG. 6 is a flow chart illustrating a process according to an aspect of the instant disclosure, wherein the UE returns the UL to the source cell at the start stage. FIG. 7 is a call flow diagram further illustrating the process of FIG. 6.

In the process illustrated in FIGS. 6-7, the baton handover begins at block 610 by switching transmission of the UL (e.g., UL DPCH) from the source cell 720 to the target cell 730 while maintaining the DL with the source cell 720. This point in time, when the UL and the DL are with different cells, is what is referred to herein as the start stage. According to various aspects of this disclosure, there are certain triggers that may cause a determination to return the transmission of the UL from the target cell 730 back to the source cell 720 at the start stage. In an aspect of the disclosure, shown at block 620, at the start stage, the target cell 730 may determine for the UE 710 to return to the source cell 720 based on a failure of the UL to the target cell 730. For example, the target cell 730 may detect the failure of the UL and, as shown in block 630, the target cell 730 may report the failure to the network. In response, as shown at block 640, the network may report the failure at the target cell 730 to the source cell 720. The source cell 720 may then send a PHYSICAL CHANNEL RECONFIGURATION message as shown in block 650 to instruct the UE 710 to return the UL from the target cell 730 to the source cell 720, which procedure may be executed as shown in block 660. Here, a failure of the UL as determined in block 620 might mean that a timer corresponding to the time in block 610 that the transmission of the UL switched from the source cell 720 to the target cell 730 expired; or the failure of the UL might mean that some metric of quality of the UL is lower than a threshold value (e.g., a predetermined threshold). The metric of quality of the UL may be a signal power, a bit error rate, a signal to noise ratio (e.g., SINR), or any other suitable metric that generally indicates the quality of the UL or the channel over which the UL is transmitted.

In FIG. 7, the source cell 720 and target cell 730 may be communicatively coupled through an intermediary Radio Network Controller (RNC, not illustrated), coupled directly to one another, or coupled through some other network or other coupling. For example, if the target cell 730 detects a failure of the UL in block 620, the target cell 730 may report this failure to the source cell 720, such that the source cell 720 may accordingly instruct the UE 710 to return to the source cell 720 with the PHYSICAL CHANNEL RECONFIGURATION message 750. Based on the instruction from the source cell 720, the UE 710 may then return the transmission of the UL from the target cell 730 to the source cell 720.

In another aspect of the disclosure, at the start stage, the UE 710 may determine to return the transmission of the UL to the source cell 720 based on an improvement in the DL from the source cell 720, as shown at block 670. That is, a metric of quality of the DL from the source cell 720, for example, the received signal power, a signal to noise ratio (e.g., a SNR or a SINR) measured on DwPCH (Downlink Pilot CHannel) or DL DPCH (Downlink Dedicated Physical CHannel) midamble, or some other metric that generally indicates the quality of the DL or the channel utilized for the DL, has exceeded some threshold (e.g., a predetermined threshold), or an error rate of the DL is less than some error threshold (e.g., a predetermined error threshold). Here, in block 680 the UE 710 may send a MEASUREMENT REPORT message 740 over the UL to the target cell 730 to notify the network that the DL with the source cell 720 is improving. In block 690 the target cell 730 may then report this condition to the network, which may then in block 695 report to the source cell 720. Then, in block 650, the source cell 720 may accordingly instruct the UE to return to the source cell 720 with a PHYSICAL CHANNEL RECONFIGURATION message 750. Based on the instruction from the source cell 720, the UE 710 may then return the transmission of the UL from the target cell 730 to the source cell 720.

Those skilled in the art will comprehend that various processes within the spirit and scope of the instant disclosure may include numerous modifications to details of the above-described procedure, such as, for example, blocks 620 and 670 may be interchanged in sequence. Further, it is understood that if a UL failure is not detected in block 620, and the DL is not detected to be improving substantially enough to merit a return to the source cell 720, then the baton handover may be completed by switching the DL to the target cell 730 as in the conventional procedure illustrated in FIG. 5.

Figure 8:
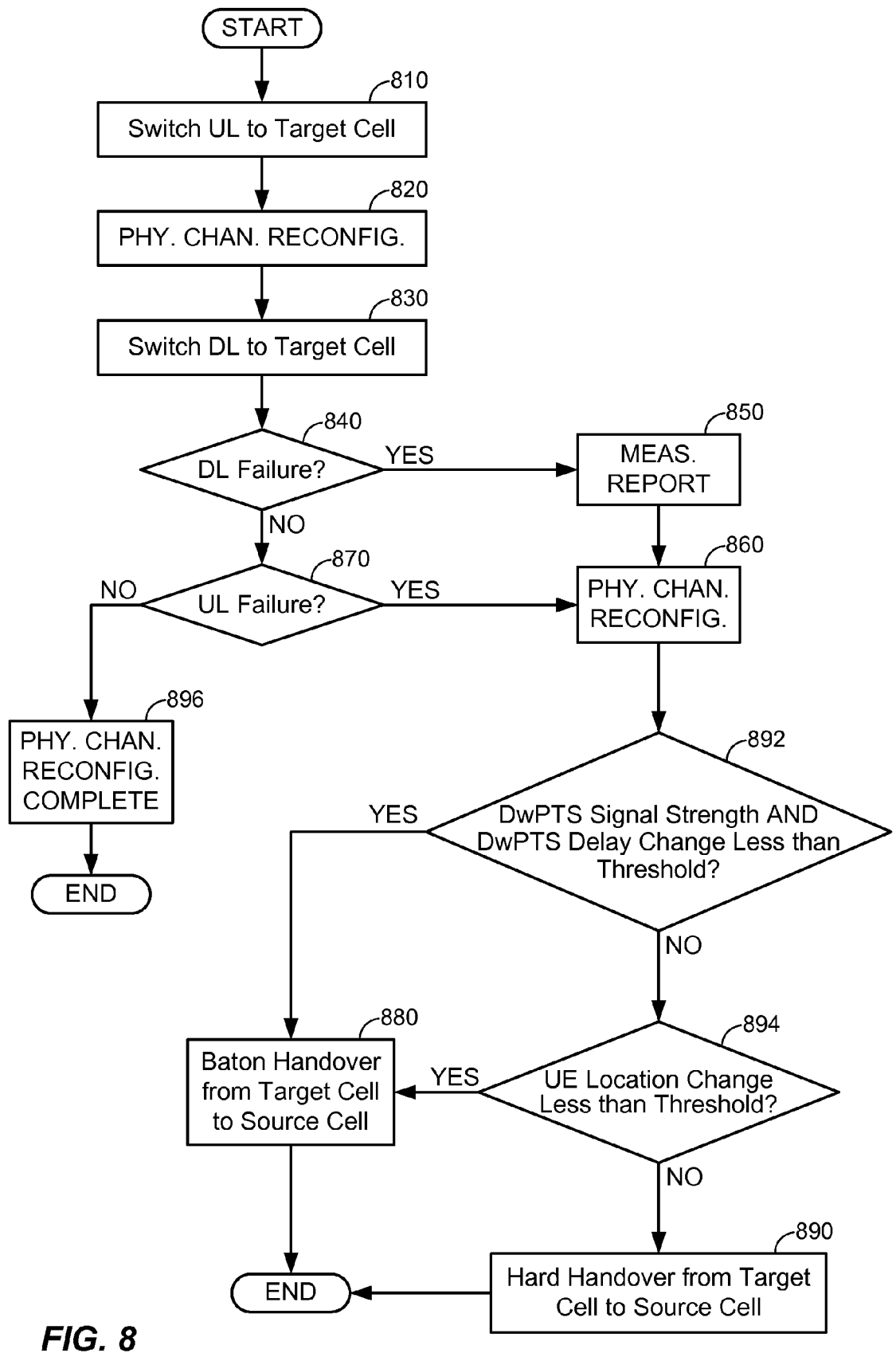
FIG. 8 is a flow chart conceptually illustrating a baton handover procedure according to an aspect of the instant disclosure.
Figure 9:
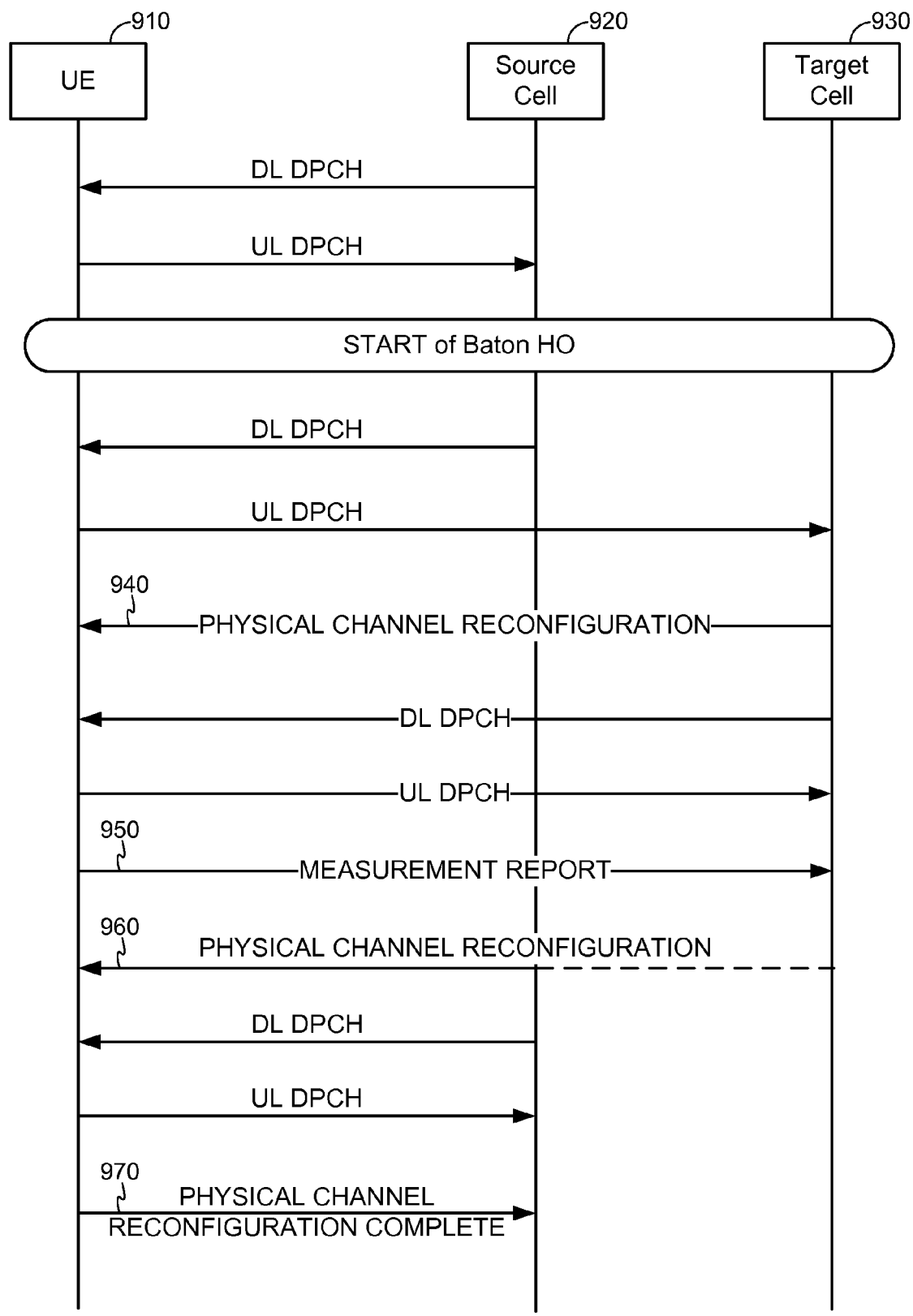
FIG. 9 is a call flow diagram illustrating the handover process illustrated in FIG. 8.

FIG. 8 is a flow chart illustrating a process according to an aspect of the instant disclosure, wherein the UE returns to the source cell at the end stage. FIG. 9 is a call flow diagram further illustrating the process of FIG. 8.

According to the process illustrated in FIGS. 8-9, the UE 910 may start a baton handover procedure in block 810 by switching the transmission of the UL from the source cell 920 to the target cell 930 while maintaining the DL with the source cell 920. Confirmation of a successful switch of the UL may be made to the UE 910 as in block 820 via a PHYSICAL CHANNEL RECONFIGURATION message 940. Next, in block 830, the transmission of the DL may be switched from the source cell 920 to the target cell 930.

According to an aspect of the disclosure, in block 840, the UE 910 may detect a failure of the DL during the end stage, i.e., after the UL and DL have switched to the target cell 930, but prior to the sending of the PHYSICAL CHANNEL RECONFIGIRATION COMPLETE message indicating the handover is complete. For example, the UE 910 may determine that there is a failure in the DL with the target cell 930. For example, the received signal power or SIR (Signal to Interference Ratio) measured on the DwPCH or DL DPCH may be below some threshold (e.g., a predetermined threshold); the UE may not be able to acquire the DL after some time (e.g., a predetermined time); or the UE may acquire the DL with a higher block error rate than some error threshold (e.g., a predetermined error threshold). Here, when the UE 910 detects the failure of the DL at the target cell 930, in block 850 the UE 910 may transmit a MEASUREMENT REPORT message 950 to the target cell 930 via the UL, and in block 860 the source cell 920 may transmit a PHYSICAL CHANNEL RECONFIGURATION message 960 to the UE 910 instructing the UE 910 to switch (or return) both DL and UL channels from the target cell 930 to the source cell 920. Note that the UE 910 may keep a channel open with the source cell 920 during the end stage, such that the reconfiguration message 960 may be received by the UE 910 despite the failure of the DL with the target cell 930.

According to another aspect of this disclosure, in block 870 the target cell 930 may detect a failure of the UL at the end stage. For example, the UL may have a block error rate higher than a threshold (e.g., a predetermined threshold). Note that in a case where the UL is deteriorating, the UE 910 may fail in sending the MEASUREMENT REPORT 950 to the network to indicate that a return to the source cell 920 is desired. Thus, at a UL failure, the source cell 920 or target cell 930 may send the PHYSICAL CHANNEL RECONFIGURATION message 960 to the UE 910 to instruct the UE 910 to switch both the DL and UL channels from the target cell 930 to the source cell 920.

Note that in FIG. 9, the PHYSICAL CHANNEL RECONFIGURATION message 960 is illustrated with a dashed line from the target cell 930 to the UE 910, and a solid line from the source cell 920 to the UE 910. This indicates that, depending on whether the DL with the target cell 930 has been established, this message may come from the source cell 920 or the target cell 930. That is, as discussed briefly above, after the UE 910 switches the DL from the source cell 920 to the target cell 930, but prior to the time when the UE 910 sends the PHYSICAL CHANNEL RECONFIGURATION COMPLETE message 970 (i.e., during the end stage), both the source cell 920 and the target cell 930 may have allocated resources for this particular UE 910. Thus, it is possible that the UE 910 can receive information from both the source cell 920 and the target cell 930 during this time.

As discussed above with respect to FIG. 7, in FIG. 9, the source cell 920 and the target cell 930 may be communicatively coupled to one another either directly or through an intermediary such as an RNC (not illustrated, but see FIG. 1), such that they are capable of communicating the status of the handover to one another.

According to a further aspect of this disclosure, the procedure of returning to the source cell 910 during the end stage may utilize either a hard handover (see block 890), wherein the UL and the DL are switched at substantially the same time, or a baton handover (see block 880), wherein the return of the UL from the target cell 930 to the source cell 920 is established, and possibly confirmed, prior to the return of the DL from the target cell 930 to the source cell 920. In an aspect of the disclosure, the decision as to whether to utilize a baton handover or a hard handover for the return may depend on the following decision rules.

In block 892, the process may determine whether a metric of quality of the downlink changes by an amount greater than some threshold (e.g., a predetermined threshold) between the time when the handover starts and the current time. Here, the metric of quality may be one or both of the received signal strength or the delay on the DwPCH of the source cell. In block 894, the process may determine whether the geographic location of the UE changes by an amount (e.g., a distance) greater than some threshold (e.g., a predetermined threshold) between the time when the handover starts and the current time. If one or both of the above two tests are true, the UE may utilize a baton handover for the return procedure. Here, the baton handover retains its advantages over the hard handover, and the baton handover is appropriate because the radio link condition may be about the same as when the handover initiated. If both of the above two tests are false, it implies that the radio link condition may be changing, and thus it may be more appropriate for the UE to perform a hard handover. According to a further aspect of this disclosure, in order to facilitate the return handover from the target cell to the source cell, the UE may store a parameter that provides information about timing (e.g., the previous transmit power and/or timing information) to facilitate the return to the source cell using baton handover or hard handover.

In order to support return to the source cell, the source cell may maintain the resources on physical channels for the UE to return. The network (e.g., the RNC) may have a maximum retaining timer which may start as soon as the baton handover begins. At the expiration of the timer, if the handover to the target cell and the return to the source cell fail, the RNC may send an instruction to both the source cell and target cell to release the allocated resources due to a call drop during handover. This procedure enables the system to avoid the situation when the UE fails to communicate with the network. Further, in order to enable the UE to measure and report information about the channel(s), according to various aspects of the disclosure, the network may send a MEASUREMENT CONTROL message to the UE to configure certain measurement of characteristics of channels associated with the source cell and target cell during the baton handover, as well as the report trigger when the source cell is improving or the target cell is deteriorating.

Finally, if neither the DL nor the UL fail, as determined in blocks 840 and 870, in block 896 the UE 910 may send the PHYSICAL CHANNEL RECONFIGURATION COMPLETE to the target cell, indicating that the baton handover succeeded and it is not necessary to return to the source cell 920.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication in a cellular network comprising a source cell and a target cell, the method comprising:
    switching transmission of an uplink from the source cell to the target cell while maintaining a downlink with the source cell;
    determining to return the transmission of the uplink to the source cell after the switching; and
    returning the transmission of the uplink from the target cell to the source cell.

2. The method of claim 1, wherein the determining to return the transmission of the uplink to the source cell comprises determining a failure of the uplink to the target cell.

3. The method of claim 2, wherein the determining the failure of the uplink to the target cell comprises determining, at an expiration of a timer corresponding to the switching the transmission of the uplink from the source cell to the target cell, that the uplink to the target call was not acquired.

4. The method of claim 2, wherein the determining the failure of the uplink to the target cell comprises determining that an error rate of the uplink is higher than a threshold error rate.

5. The method of claim 1, wherein the determining to return the transmission of the uplink to the source cell comprises determining that at least one of a signal strength or a SINR of the downlink has increased, or that an error rate of the downlink has decreased.

6. The method of claim 1, further comprising:
    switching reception of a downlink from the source cell to the target cell;
    determining to return the reception of the downlink to the source cell; and
    returning the reception of the downlink from the target cell to the source cell.

7. The method of claim 6, wherein the determining to return the reception of the downlink to the source cell comprises determining a failure of the downlink from the target cell.

8. The method of claim 7, wherein the determining the failure of the downlink from the target cell comprises determining that at least one of a signal strength or a SINR of the downlink is lower than a threshold, or that an error rate is higher than an error threshold.

9. The method of claim 7, wherein the determining the failure of the downlink from the target cell comprises determining, at an expiration of a timer corresponding to the switching the transmission of the downlink from the source cell to the target cell, that the downlink from the target cell was not acquired.

10. The method of claim 6, wherein, when a location of a user equipment utilizing the uplink and the downlink, or a metric of quality of the downlink, are substantially the same since a time when the switching the transmission of the uplink began, the returning the reception of the downlink from the target cell to the source cell comprises first returning the transmission of the uplink from the target cell to the source cell, and subsequently returning the reception of the downlink from the target cell to the source cell.

11. The method of claim 10, wherein the metric of quality of the downlink comprises a received signal strength corresponding to the downlink and a delay in the downlink.

12. The method of claim 6, wherein, when a location of a user equipment utilizing the uplink and the downlink, and a metric of quality of the downlink, have changed by an amount greater than respective predetermined thresholds, the returning the reception of the downlink from the target cell to the source cell comprises returning the transmission of the uplink and the reception of the downlink from the target cell to the source cell at substantially the same time.

13. The method of claim 12, wherein the metric of quality of the downlink comprises a received signal strength corresponding to the downlink and a delay in the downlink.

14. The method of claim 1, wherein the switching the transmission of the uplink from the source cell to the target cell comprises storing a transmission power and a timing parameter corresponding to the uplink, and the returning the transmission of the uplink from the target cell to the source cell comprises utilizing the stored transmission power and timing parameter for the transmission of the uplink.

15. An apparatus for wireless communication in a cellular network comprising a source cell and a target cell, the apparatus comprising:
    means for switching transmission of an uplink from the source cell to the target cell while maintaining a downlink with the source cell;
    means for determining to return the transmission of the uplink to the source cell after the switching; and
    means for switching the transmission of the uplink from the target cell to the source cell.

16. The apparatus of claim 15, wherein the means for determining to return the transmission of the uplink to the source cell comprises means for determining a failure of the uplink to the target cell.

17. The apparatus of claim 16, wherein the means for determining the failure of the uplink to the target cell comprises means for determining, at an expiration of a timer corresponding to the switching the transmission of the uplink from the source cell to the target cell, that the uplink to the target was not acquired.

18. The apparatus of claim 16, wherein the means for determining the failure of the uplink to the target cell comprises means for determining that an error rate of the uplink is higher than a threshold error rate.

19. The apparatus of claim 15, wherein the means for determining to return the transmission of the uplink to the source cell comprises means for determining that at least one of a signal strength or a SINR of the downlink has increased, or that an error rate of the downlink has decreased.

20. The apparatus of claim 15, further comprising:
    means for switching reception of a downlink from the source cell to the target cell;
    means for determining to return the reception of the downlink to the source cell; and
    means for returning the reception of the downlink from the target cell to the source cell.

21. The apparatus of claim 20, wherein the means for determining to return the reception of the downlink to the source cell comprises means for determining a failure of the downlink from the target cell.

22. The apparatus of claim 21, wherein the means for determining the failure of the downlink from the target cell comprises means for determining that at least one of a signal strength or a SINR of the downlink is lower than a threshold, or that an error rate is higher than an error threshold.

23. The apparatus of claim 21, wherein the means for determining the failure of the downlink from the target cell comprises means for determining, at an expiration of a timer corresponding to the switching the transmission of the downlink from the source cell to the target cell, that the downlink from the target cell was not acquired.

24. The apparatus of claim 20, wherein, when a location of a user equipment utilizing the uplink and the downlink, or a metric of quality of the downlink, are substantially the same since a time when the switching the transmission of the uplink began, the means for returning the reception of the downlink from the target cell to the source cell comprises means for first returning the transmission of the uplink from the target cell to the source cell, and subsequently returning the reception of the downlink from the target cell to the source cell.

25. The apparatus of claim 24, wherein the metric of quality of the downlink comprises a received signal strength corresponding to the downlink and a delay in the downlink.

26. The apparatus of claim 20, wherein, when a location of a user equipment utilizing the uplink and the downlink, and a metric of quality of the downlink, have changed by an amount greater than respective predetermined thresholds, the means for returning the reception of the downlink from the target cell to the source cell comprises means for returning the transmission of the uplink and the reception of the downlink from the target cell to the source cell at substantially the same time.

27. The apparatus of claim 26, wherein the metric of quality of the downlink comprises a received signal strength corresponding to the downlink and a delay in the downlink.

28. The apparatus of claim 15, wherein the means for switching the transmission of the uplink from the source cell to the target cell comprises means for storing a transmission power and a timing parameter corresponding to the uplink, and the means for returning the transmission of the uplink from the target cell to the source cell comprises means for utilizing the stored transmission power and timing parameter for the transmission of the uplink.

29. A computer program product, comprising:
a non-transitory computer-readable medium comprising:
code for switching transmission of an uplink from the source cell to the target cell while maintaining a downlink with the source cell;
code for determining to return the transmission of the uplink to the source cell after the switching; and
code for switching the transmission of the uplink from the target cell to the source cell.

30. The computer program product of claim 29, wherein the code for determining to return the transmission of the uplink to the source cell comprises code for determining a failure of the uplink to the target cell.

31. The computer program product of claim 30, wherein the code for determining the failure of the uplink to the target cell comprises code for determining, at an expiration of a timer corresponding to the switching the transmission of the uplink from the source cell to the target cell, that the uplink to the target was not acquired.

32. The computer program product of claim 30, wherein the code for determining the failure of the uplink to the target cell comprises code for determining that an error rate of the uplink is higher than a threshold error rate.

33. The computer program product of claim 29, wherein the code for determining to return the transmission of the uplink to the source cell comprises code for determining that at least one of a signal strength or a SINR of the downlink has increased, or that an error rate of the downlink has decreased.

34. The computer program product of claim 29, further comprising
code for switching reception of a downlink from the source cell to the target cell;
code for determining to return the reception of the downlink to the source cell; and
code for returning the reception of the downlink from the target cell to the source cell.

35. The computer program product of claim 34 wherein the code for determining to return the reception of the downlink to the source cell comprises code for determining a failure of the downlink from the target cell.

36. The computer program product of claim 35, wherein the code for determining the failure of the downlink from the target cell comprises code for determining that at least one of a signal strength or a SINR of the downlink is lower than a threshold, or that an error rate is higher than an error threshold.

37. The computer program product of claim 35, wherein the code for determining the failure of the downlink from the target cell comprises code for determining, at an expiration of a timer corresponding to the switching the transmission of the downlink from the source cell to the target cell, that the downlink from the target cell was not acquired.

38. The computer program product of claim 34, wherein, when a location of a user equipment utilizing the uplink and the downlink, or a metric of quality of the downlink, are substantially the same since a time when the switching the transmission of the uplink began, the code for returning the reception of the downlink from the target cell to the source cell comprises code for first returning the transmission of the uplink from the target cell to the source cell, and subsequently returning the reception of the downlink from the target cell to the source cell.

39. The computer program product of claim 38, wherein the metric of quality of the downlink comprises a received signal strength corresponding to the downlink and a delay in the downlink.

40. The computer program product of claim 34, wherein, when a location of a user equipment utilizing the uplink and the downlink, and a metric of quality of the downlink, have changed by an amount greater than respective predetermined thresholds, the code for returning the reception of the downlink from the target cell to the source cell comprises code for returning the transmission of the uplink and the reception of the downlink from the target cell to the source cell at substantially the same time.

41. The computer program product of claim 40, wherein the metric of quality of the downlink comprises a received signal strength corresponding to the downlink and a delay in the downlink.

42. The computer program product of claim 29 wherein the code for switching the transmission of the uplink from the source cell to the target cell comprises code for storing a transmission power and a timing parameter corresponding to the uplink, and the code for returning the transmission of the uplink from the target cell to the source cell comprises code for utilizing the stored transmission power and timing parameter for the transmission of the uplink.

43. An apparatus for wireless communication in a cellular network comprising a source cell and a target cell, the apparatus comprising:
at least one processor; and
a memory coupled to the at least one processor,
wherein the at least one processor is configured to:
switch transmission of an uplink from the source cell to the target cell while maintaining a downlink with the source cell;
determine to return the transmission of the uplink to the source cell after the switching; and
return the transmission of the uplink from the target cell to the source cell.

44. The apparatus of claim 43, wherein the determining to return the transmission of the uplink to the source cell comprises determining a failure of the uplink to the target cell.

45. The apparatus of claim 44, wherein the determining the failure of the uplink to the target cell comprises determining, at an expiration of a timer corresponding to the switching the transmission of the uplink from the source cell to the target cell, that the uplink to the target call was not acquired.

46. The apparatus of claim 44 wherein the determining the failure of the uplink to the target cell comprises determining that an error rate of the uplink is higher than a threshold error rate.

47. The apparatus of claim 43, wherein the determining to return the transmission of the uplink to the source cell comprises determining that at least one of a signal strength or a SINR of the downlink has increased, or that an error rate of the downlink has decreased.

48. The apparatus of claim 43, wherein the at least one processor is further configured to:
   switch reception of a downlink from the source cell to the target cell;
   determine to return the reception of the downlink to the source cell; and
   return the reception of the downlink from the target cell to the source cell.

49. The apparatus of claim 48, wherein the determining to return the reception of the downlink to the source cell comprises determining a failure of the downlink from the target cell.

50. The apparatus of claim 49, wherein the determining the failure of the downlink from the target cell comprises determining that at least one of a signal strength or a SINR of the downlink is lower than a threshold, or that an error rate is higher than an error threshold.

51. The apparatus of claim 49, wherein the determining the failure of the downlink from the target cell comprises determining, at an expiration of a timer corresponding to the switching the transmission of the downlink from the source cell to the target cell, that the downlink from the target cell was not acquired.

52. The apparatus of claim 48, wherein, when a location of a user equipment utilizing the uplink and the downlink, or a metric of quality of the downlink, are substantially the same since a time when the switching the transmission of the uplink began, the returning the reception of the downlink from the target cell to the source cell comprises first returning the transmission of the uplink from the target cell to the source cell, and subsequently returning the reception of the downlink from the target cell to the source cell.

53. The apparatus of claim 52, wherein the metric of quality of the downlink comprises a received signal strength corresponding to the downlink and a delay in the downlink.

54. The apparatus of claim 48, wherein, when a location of a user equipment utilizing the uplink and the downlink, and a metric of quality of the downlink, have changed by an amount greater than respective predetermined thresholds, the returning the reception of the downlink from the target cell to the source cell comprises returning the transmission of the uplink and the reception of the downlink from the target cell to the source cell at substantially the same time.

55. The apparatus of claim 54, wherein the metric of quality of the downlink comprises a received signal strength corresponding to the downlink and a delay in the downlink.

56. The apparatus of claim 43, wherein the switching the transmission of the uplink from the source cell to the target cell comprises storing a transmission power and a timing parameter corresponding to the uplink, and the returning the transmission of the uplink from the target cell to the source cell comprises utilizing the stored transmission power and timing parameter for the transmission of the uplink.

* * * * *